June 2, 1942.                B. HANSSON                2,284,865
MACHINE FOR THE EXTRUSION OF PLASTIC MASSES, SUCH AS RUBBER
Filed Jan. 11, 1939
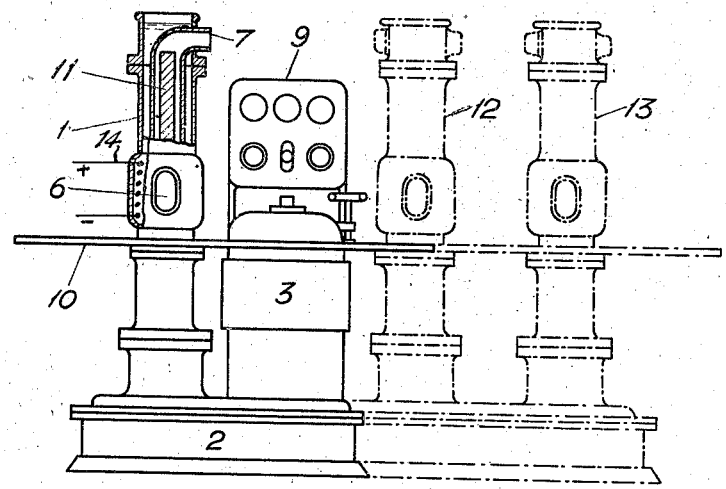
Inventor
Bror Hansson
per
Attorney Patented June 2, 1942

2,284,865

UNITED STATES PATENT OFFICE 2,284,865

MACHINE FOR THE EXTRUSION OF PLASTIC MASSES, SUCH AS RUBBER

Bror Hansson, Stockholm, Sweden, assignor to Allmanna Svenska Elektriska Aktiebolaget, Vasteras, Sweden, a corporation of Sweden Application January 11, 1939, Serial No. 250,308
In Great Britain February 24, 1938

2 Claims. (Cl. 18—12)

The present invention relates to machines for the manufacture of articles of plastic masses, such as rubber, artificial resins and the like by means of extrusion. These machines generally consist of a motor driven extrusion mechanism, the main part of which is a screw pressing out the plastic mass through a nozzle or die of suitable shape. A reduction gear is generally arranged between the motor and the extrusion mechanism in order to reduce the motor speed to a speed suitable for the extrusion. In the constructions hitherto known the extrusion mechanism is horizontally mounted. This necessitates the mounting of the whole mechanism and also the motor and gear casing on a high bed plate in order to obtain a suitable working height for the extrusion.

The present invention has for its object to simplify this arrangement by using the gear casing as the bed plate for the vertically mounted extrusion mechanism. Considerable advantages are gained by this which will appear more clearly from the following description given with reference to the accompanying drawing which shows in front view an extrusion machine having a design according to the invention, but the invention is not restricted to this particular design.

The drawing shows the extrusion mechanism 1 and the electrical motor 3 with vertical shafts and mounted on the gear casing 2 which serves as a bed plate. A control board 9 for the motor is also mounted on the gear casing. Underneath the inlet opening 6 for the plastic paste the vertical extrusion mechanism is braced to the motor by means of a plate 10 serving as a work-table, which prevents the plastic paste, for instance unvulcanized rubber, falling down on to the floor and protects it from dust, sand and other impurities which result in faults in the extruded articles. The upper part of the extrusion mechanism is shown in section and shows the screw 11 and the nozzle 7 which is horizontally directed.

An important feature of the invention is the great saving in space obtained. The drawing shows in dash and dot lines two further extrusion mechanisms 12, 13 mounted on a common gear casing with the extrusion mechanism 1 and driven by the same motor 3, the whole occupying a space no larger than that of the usual arrangement of one extrusion machine. The placing of three rubber extrusion mechanisms side by side in the manner shown and braced by a common work-table plate 10 facilitates to a very high degree the applying of rubber coatings to electric wires. The rubber is prepared by heating and kneading in the first mechanism 1, from which it is extruded in two strings to the inlet openings of the other extrusion mechanisms, of which one, 12, applies a first coating and the other, 13, applies a second coating to the electric wire, passing through the die heads of the same.

A suitable working height both for the inlet of the rubber and the outlet of the extruded article is obtained without the use of heavy bed plates.

A further great importance of the invention is, however, that it can most advantageously be adapted to an effective temperature control system in which the plastic mass is cooled by a fluid which is kept at its boiling temperature by means of the friction work. By this means an even and most suitable temperature distribution is obtained in the extrusion mechanism. The simplicity of this temperature control system in connection with the invention will appear from the upper, sectioned part of the extrusion mechanism 1. The space between the screw-containing tube and the outer shell of the extrusion mechanism is filled with water which may be poured in from time to time or continuously supplied in order to replace evaporated water. The water is heated partly by a regulatable electric heating element 14 placed at the bottom of the water-containing space, and partly by the friction work in the plastic masses kneaded by the screw 11. By this arrangement the heat is concentrated in the upper part of the extrusion mechanism where the highest temperature is required and where it can be applied without the risk of vulcanizing the extruded rubber article.

I claim as my invention:

1. A machine for the extrusion of plastic masses such as rubber comprising a vertically disposed extrusion tube having an inlet adjacent its lower end and an extrusion outlet adjacent its upper end, a shell surrounding and coextensive with said tube to form a chamber therebetween adapted to contain a fluid, and means disposed adjacent the lower end of said chamber for heating the fluid contained in said chamber whereby such fluid is heated by said heating means and by the working of the mass in said tube to the proper temperature for extrusion purposes and the heat is thus concentrated in the upper extrusion end of the extrusion tube.

2. A machine as in claim 1, said heating means comprising a regulatable electrical heating element positioned at the bottom of said chamber.

BROR HANSSON.